UNITED STATES PATENT OFFICE.

JACOB C. McCARTY, OF EDRAY, WEST VIRGINIA.

COMPOUND FOR FUEL AND FIRE-KINDLERS.

SPECIFICATION forming part of Letters Patent No. 229,159, dated June 22, 1880.

Application filed April 8, 1880. (Specimens.)

*To all whom it may concern:*

Be it known that I, JACOB CURTIS MCCARTY, of Edray, in the county of Pocahontas and State of West Virginia, have invented a new and useful Improvement in Compounds, of which the following is a specification.

My invention relates to means for increasing the calorific properties of charcoal, coke, or coal to be used in working iron in foundries, furnaces, or forges, but is more particularly intended to be applied to charcoal.

The invention consists in a solution of chloride of sodium, sulphate of iron, and nitrate of potash for saturating the fuel before it is used, whereby its heat-giving power is increased and a better quality and greater quantity of iron is produced.

The ingredients are prepared in about the following proportions: Six pounds of chloride of sodium to three gallons of water; four ounces of sulphate of iron to three gallons of water; two ounces of nitrate of potash to three gallons of water—the whole mixed together and thoroughly dissolved.

The proportions of each ingredient and the quantity of water may, of course, be somewhat varied without materially changing the character of the solution.

The fuel is thoroughly saturated with the solution, and may be used either wet or dry.

The effect of the solution is more perceptible on charcoal than on the others, owing to its greater porosity, which enables it to absorb a greater quantity of the solution.

Having thus described my invention, I claim as new and desire to secure by Letters Patent—

A compound for saturating charcoal, coke, or coal to be used as fuel, consisting of a solution of chloride of sodium, sulphate of iron, and nitrate of potash, prepared and used in the manner and for the purpose herein described.

JACOB CURTIS McCARTY.

Witnesses:
 WILLIAM M. SHARP,
 J. B. YOUNG.